Dec. 12, 1967   F. V. MINGRONE ET AL   3,357,453
VALVE CONSTRUCTION AND PARTS THEREFOR OR THE LIKE
Filed May 26, 1965   4 Sheets-Sheet 1

INVENTORS
FRANK V. MINGRONE
DAVID L. MORGAN

*Cauda & Cauda*

THEIR ATTORNEYS

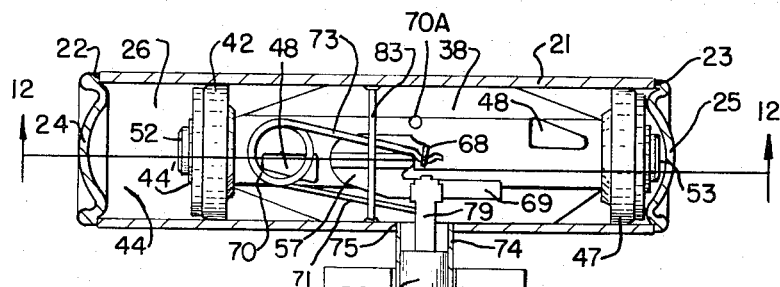
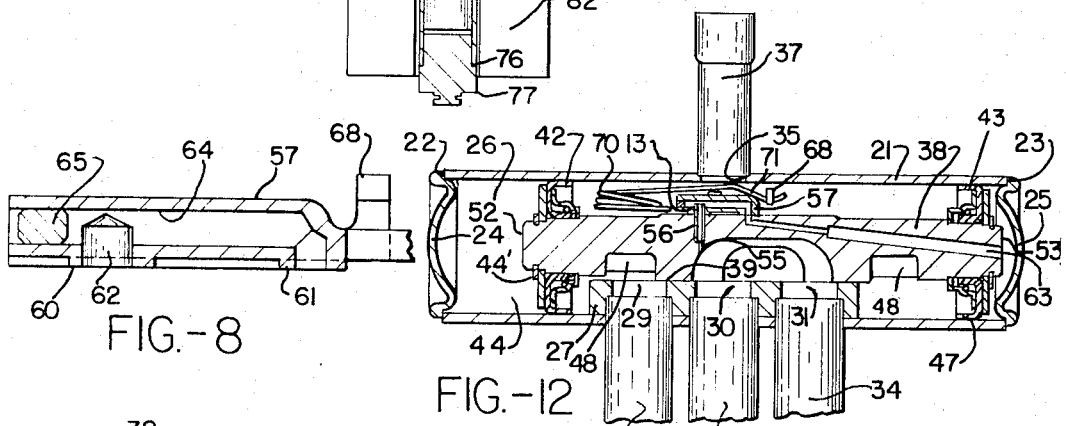
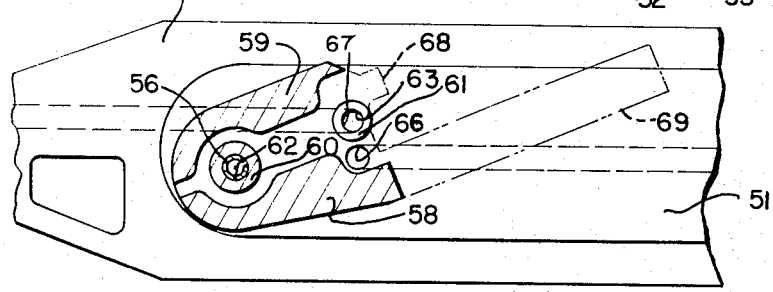
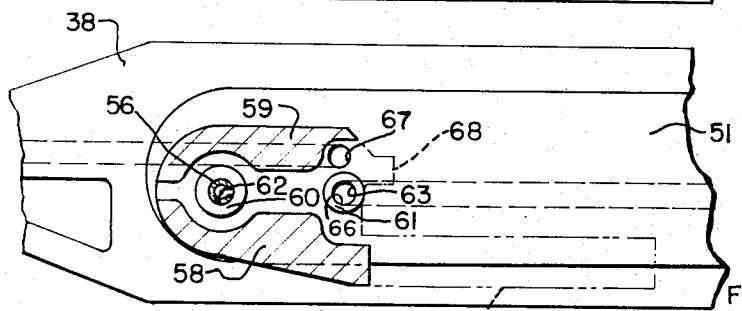

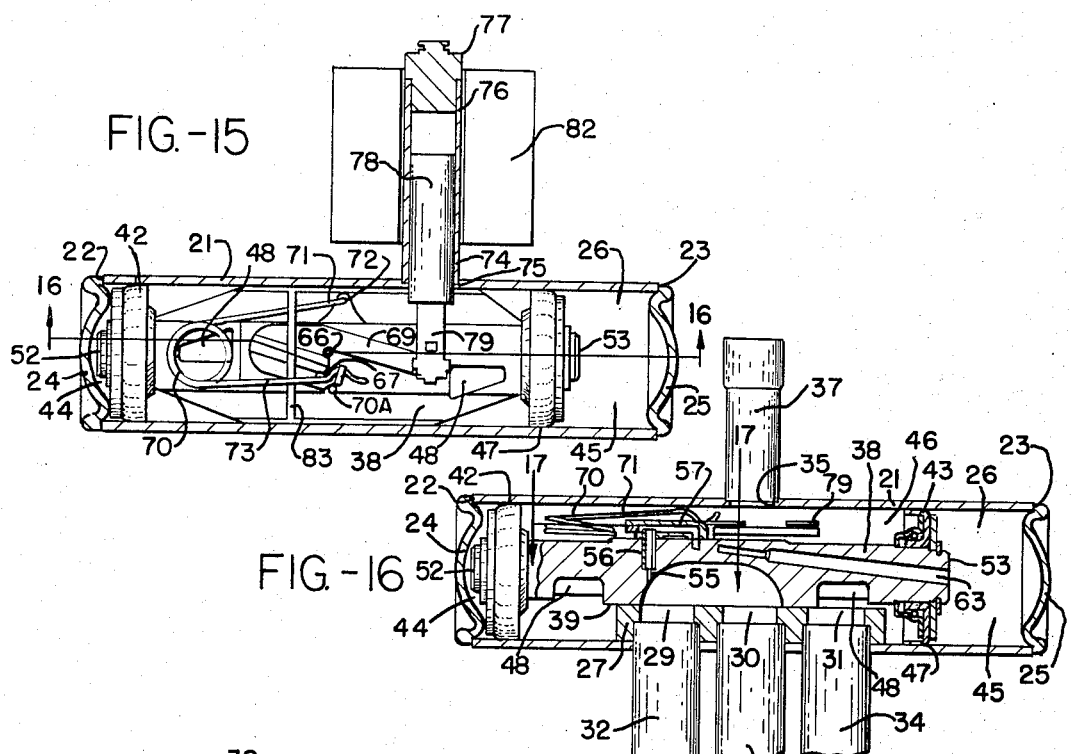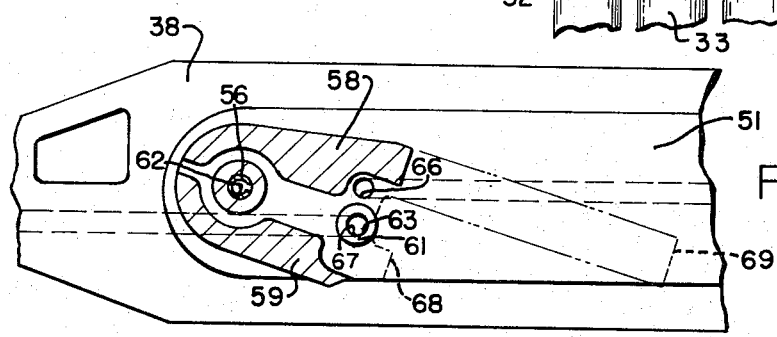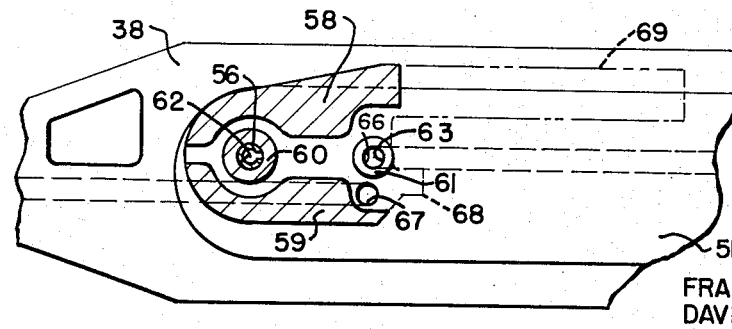

United States Patent Office 3,357,453
Patented Dec. 12, 1967

3,357,453
VALVE CONSTRUCTION AND PARTS THEREFOR OR THE LIKE
Frank V. Mingrone, Mildord, New Haven, and David L. Morgan, Shelton, Fairfield, Conn., assignors to Robertshaw Controls Company, Richmond, Va., a corporation of Delaware
Filed May 26, 1965, Ser. No. 459,025
19 Claims. (Cl. 137—625.63)

ABSTRACT OF THE DISCLOSURE

This disclosure relates to a valve construction having an axially movable main valve member pivotally carrying a pilot valve member which when in one pivoted position, will direct high pressure fluid to one end of the main valve member to move the same in a direction toward the other end thereof with the pilot valve member interconnecting the other end of the main valve member to a low pressure source or exhaust. When the pilot valve member is pivoted to another position thereof, the same causes the source of high pressure fluid to be directed toward the other end of the main valve member to move the same toward the one end thereof while the pilot valve member exhausts the one end of the main valve member to the low pressure source or exhaust.

---

This invention relates to an improved valve construction and to improved parts for such a valve construction or the like.

In particular, one embodiment of this invention provides a four way main valve member which is moved between its opening position by means of a pilot valve member carried on the main valve member, the pilot valve member being actuated in any desired manner.

For example, the pilot valve member can be normally urged to one position thereof to tend to maintain the main valve member in one operating position thereof. However, when a suitable actuator is actuated, such as the energizing of a solenoid coil or the like, the pilot valve member is moved to another operating position thereof to shift the main valve member to another operating position thereof for any desired purpose.

Accordingly, it is an object of this invention to provide an improved valve construction having one or more of the novel features set forth above or hereinafter shown or described.

Another object of this invention is to provide improved parts for such a valve construction or the like.

Other objects, uses and advantages of this invention are apparent from a reading of this description which proceeds with reference to the accompanying drawings forming a part thereof and wherein:

FIGURE 8 is an enlarged, cross-sectional view taken on line 8—8 of FIGURE 6.

FIGURE 11 is a view similar to FIGURE 2 and illustrates the valve construction in another operating position thereof.

FIGURE 12 is a cross-sectional view taken on line 12—12 of FIGURE 11.

FIGURE 13 is an enlarged, fragmentary cross-sectional view taken on line 13—13 of FIGURE 9.

FIGURE 14 is a view similar to FIGURE 13 and illustrates the pilot valve member in another operating position thereof.

FIGURE 15 is a view similar to FIGURE 2 and illustrates another embodiment of this invention.

FIGURE 16 is a cross-sectional view taken on line 16—16 of FIGURE 15.

FIGURE 17 is a fragmentary, cross-sectional view taken on line 17—17 of FIGURE 16.

FIGURE 18 is a view similar to FIGURE 17 and illustrates the pilot valve member in another operating position thereof.

Figure 1:
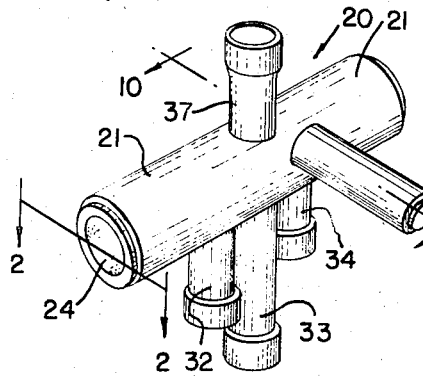
FIGURE 1 is a perspective view of the improved valve construction of this invention.

While the various features of this invention are hereinafter described and illustrated as being particularly adaptable to provide a main four way valve construction, it is to be understood that the various features of this invention can be utilized singly or in any combination thereof to provide other types of valve construction as desired.

Therefore, this invention is not to be limited to only the embodiments illustrated in the drawings, because the drawings are merely utilized to illustrate one of the wide variety of uses of this invention.

Referring now to FIGURES 1, 2, 9 and 10, an improved valve construction of this invention is generally indicated by the reference numeral 20 and comprises a cylindrical valve housing 21 having the opposed open ends 22 and 23 thereof sealed closed by suitable end closure means 24 and 25 to define a cylindrical cavity 26 in the housing 21.

A valve seat member 27 is secured in the chamber 26 of the housing 21 and has a flat valve surface 28 interrupted by three ports 29, 30 and 31 respectively interconnected to tubular nipple means 32, 33 and 34, the nipple means 33 being adapted to be interconnected to an exhaust means or reservoir by suitable conduit means while the nipple means 32 and 34 are adapted to be interconnected to different fluid operated actuators or the like. However, it is to be understood that the nipple means 32, 33 and 34 could be interconnected to any suitable structure to provide a reversing operation of that structure, such as in a refrigeration system or the like, as desired.

Another port 35 passes through the housing means 21 and is interconnected to a hollow tubular nipple 37 adapted to be interconnected to a source of pressure fluid or the like whereby the source of pressure fluid is adapted to be selectively interconnected to either the outlet nipple means 32 or the outlet nipple means 34 while the other nipple means 34 or 32 is being interconnected to the exhaust or return nipple means 33 in a manner hereinafter described.

A main valve member 38 is disposed in the cavity 26 of the housing means 21 and has a valve surface 39 adapted to be disposed in sealing and sliding relation with the surface 28 of the valve seat 27.

The valve surface 39 of the valve member 38 is interrupted by a recess 40 to define a first passage means 41 in the valve member 38 which has a substantially D-shaped cross-sectional configuration.

Figure 9:
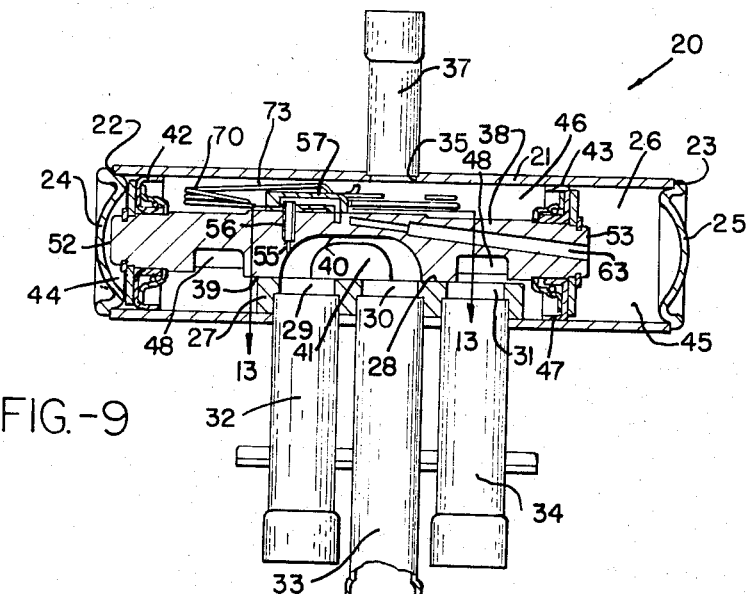
FIGURE 9 is a cross-sectional view taken on line 9—9 of FIGURE 2.

When the valve member 38 is disposed in the position illustrated in FIGURE 9, it can be seen that the first passage means 41 of the valve member 38 fluidly interconnects the port 29 with the port 30 while sealing off the port 31 from the port 30. Alternately, when the valve member 38 is disposed in the position illustrated in FIGURE 12, the first passage means 41 of the main valve member 38 fluidly interconnects the ports 31 and 30 together while sealing off the port 29 from the port 30 for a purpose hereinafter described.

The valve member 38 has opposed piston ends 42 and 43 respectively cooperating with the housing means 21 to define a pair of opposed chambers 44 and 45 completely sealed from an intermediate chamber 46, the intermediate chamber 46 being in fluid communication with the port 35.

While the piston ends 42 and 43 of the valve member 38 can be formed in any suitable manner, it can be seen in FIGURE 9 that the piston ends 42 and 43 each includes a sealing member 47 formed of any suitable material and suitably carried by the valve member 38 so that the same permits axial movement of the valve member 38 while sealing the intermediate chamber 46 from the opposed end chambers 44 and 45 for a purpose hereinafter described.

The valve member 38 has a pair of second passage means 48 passing therethrough in such a manner that the right-hand passage means 48 in the valve member 38 fluidly interconnects the intermediate chamber 46 to the port 31 when the valve member 38 is disposed in the position illustrated in FIGURE 9 whereby the nipples 37 and 34 are interconnected together and the nipples 32 and 33 are interconnected together. Alternately, the left-hand passage means 48 in the valve member 38 fluidly interconnects the intermediate chamber 46 to the port 29 when the valve member 38 is disposed in the position illustrated in FIGURE 12 whereby the nipples 37 and 32 are fluidly interconnected together and the nipples 33 and 34 are fluidly interconnected together.

Figure 3:
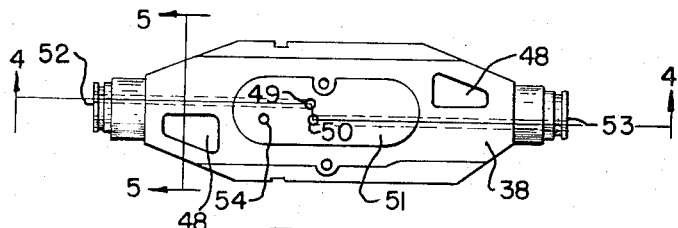
FIGURE 3 is a top view of the main valve member of the valve construction of FIGURE 2.
Figure 4:
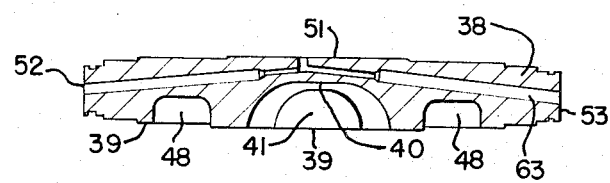
FIGURE 4 is a cross-sectional view taken on line 4—4 of FIGURE 3.

As illustrated in FIGURES 3 and 4, a pair of apertures 49 and 50 interrupt a flat pilot valve seat 51 formed on top of the main valve member 38, the aperture 49 being interconnected to an aperture 52 at the left end of the valve member 38 and the aperture 50 being interconnected to an aperture 53 at the right end of the valve member 38 whereby the aperture 49 is interconnected to the chamber 44 and the aperture 50 is interconnected to the chamber 45 for a purpose hereinafter described. Another aperture 54 interrupts the pilot valve seat 51 of the main valve member 38 and is interconnected to the first passage means 41 thereof by a passage means 55.

A hollow tubular member 56 is disposed in the aperture 54 and projects above the valve seat 51 in the manner illustrated in FIGURE 9 to provide a pivot means for a pilot valve member 57 now to be described.

Figure 6:
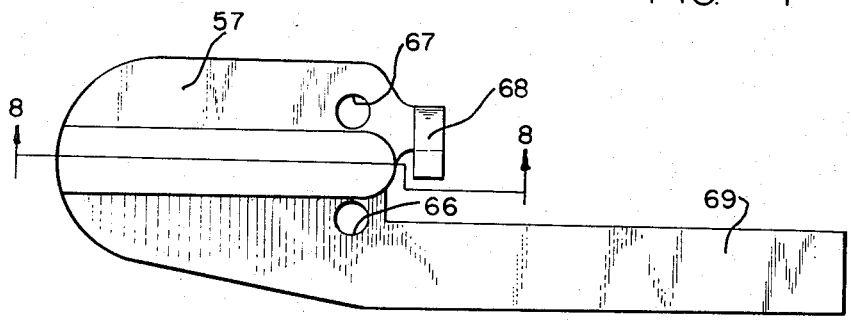
FIGURE 6 is a top plan view of the pilot valve member of the valve construction of FIGURE 2.
Figure 5:
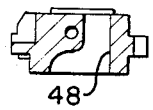
FIGURE 5 is an enlarged, cross-sectional view taken on line 5—5 of FIGURE 3.
Figure 7:
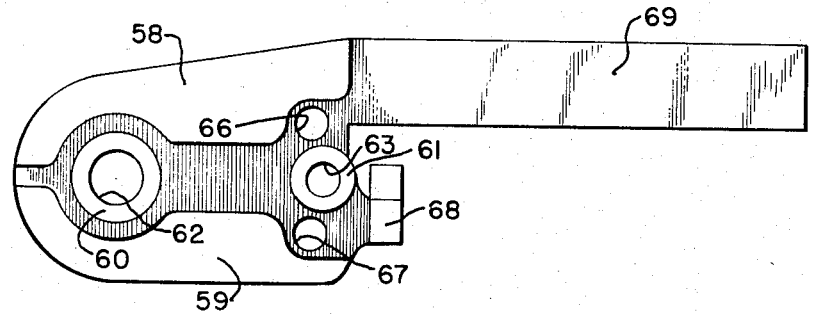
FIGURE 7 is a bottom view of the pilot valve member of FIGURE 6.

As illustrated in FIGURES 6–8, the pilot valve member 57 has the rear side thereof formed with protruding flat surfaces 58, 59, 60 and 61, the surfaces 60 and 61 being circular and having the surfaces thereof disposed in the same plane as the surfaces 58 and 59.

The surfaces 60 and 61 of the pilot valve member 57 are interrupted by openings 62 and 63 fluidly interconnected together by a passage 64 in the pilot valve member 57 in the manner illustrated in FIGURE 8, the left end of the passage 64 being sealed off by a suitable plug member 65 as illustrated in FIGURE 8.

A pair of openings 66 and 67 pass through the pilot valve member 57, the opening 66 being disposed between the surfaces 58 and 61 of the pilot valve member 57 and the opening 67 being disposed between the surfaces 61 and 59 of the pilot valve member 57 for a purpose hereinafter described.

The pilot valve member 57 is adapted to be pivotally mounted on the pilot valve seat 51 of the main valve member 38 by being telescoped over the projecting tubular member 56 with the tubular member 56 being received in the opening 62 in the surface 60 of the pilot valve member 57. In this manner, the pilot valve member 57 is adapted to be pivoted relative to the valve seat surface 51 of the main valve member 38 utilizing the tubular member 56 for its pivot point whereby the passage 64 in the pilot valve member 57 is always fluidly interconnected to the first passage 41 of the main valve member 38 and, thus, interconnected to the port 30 regardless of the position of the main valve member 38 for a purpose hereinafter described.

The pilot valve member 57 has an upwardly directed tang 68 and an outwardly extending arm 69. A safety-pin like spring 70 is provided and has one arm 71 received in an opening 72 in the valve member 38 and another arm 73 engageable with the tang 68 of the valve member 57 whereby the spring means 70 tends to maintain the valve member 57 in the position illustrated in FIGURE 2 against a stop pin 70A.

A tubular member 74 is carried by the housing 21 and is interconnected to the chamber 46 thereof by being secured in an opening 75 passing through the housing means 21. The outer end 76 of the tubular member 74 is closed by a plug member 77. A solenoid operated armature 78 is disposed in the hollow tubular member 74 and has an extension 79 provided with two spaced downwardly directed tangs 80 and 81 respectively adapted to be disposed on opposite sides of the arm 69 of the pilot valve member 57.

Figure 2:
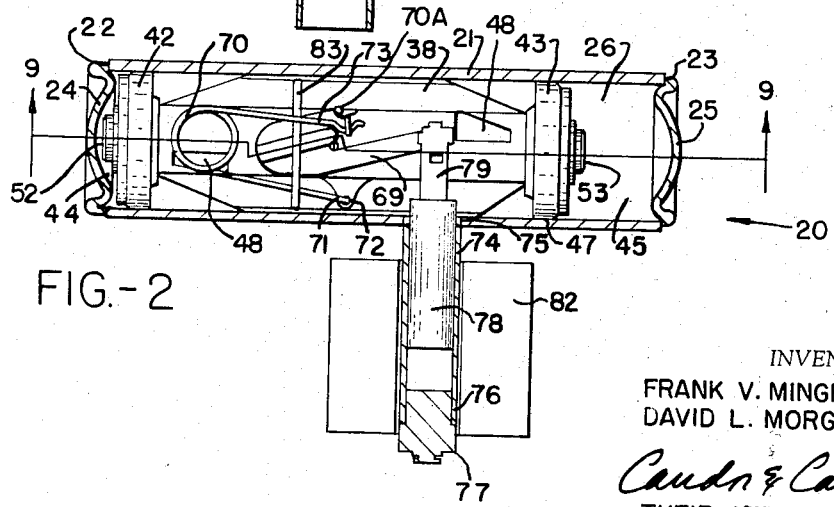
FIGURE 2 is an enlarged, cross-sectional view taken on line 2—2 of FIGURE 1.

The armature 78 is normally held in the position illustrated in FIGURE 2 by the force of the spring means 70. However, when an electrical impulse is directed to a suitable coil 82 disposed around the hollow tubular member 74, the armature 78 is drawn to the left in FIGURE 10 and downwardly in FIGURE 2 to pull the pilot valve member 57 from the position illustrated in FIGURE 2 to the position illustrated in FIGURE 11 for a purpose hereinafter described. However, when the impulse to the electrical coil 82 is terminated, the force of the spring means 70 returns the pilot valve member 57 from the position illustrated in FIGURE 11 back to the position illustrated in FIGURE 2.

In order to hold the spring means 70 and pilot valve member 57 in its assembled relation with the main valve member 38, a spring clip 83 is utilized and extends over the pilot valve member 57, over the arm 71 of the spring means 70 and under the arm means 73 thereof to be clipped into suitable mounting recesses in the main valve member 38 to hold the assembled pilot valve member 57, spring means 70 and main valve member 38 together.

The operation of the valve construction 20 of this invention will now be described.

In assuming a typical application of the valve construction 20 of this invention, the inlet nipple 37 is interconnected to the outlet side of a refrigerant compressor while the nipple 33 is interconnected to the inlet side thereof. The nipple 34 is interconnected to the inlet side of a refrigerant condenser while the nipple 32 is interconnected to the outlet side of a refrigerant evaporator.

Thus, if the valve construction 20 is disposed in the position illustrated in FIGURE 9, it can be seen that the outlet side of the refrigerant compressor delivers fluid under pressure to the intermediate chamber 46 of the housing 21 and, thus, through the right-hand passage means 48 in the valve member 38 to the nipple 34 leading to the inlet side of a refrigerant condenser whereby the refrigerant is compressed in the condenser. The compressed refrigerant is fed from the condenser through a suitable capillary arrangement to the evaporator wherein the compressed refrigerant expands to cool the desired structure adjacent the evaporator. Thereafter, the expanded fluid in the evaporator is directed to the nipple 32 of the valve construction 20 and, by means of the first passage means 41 of the valve member 38, is directed to the nipple 33 leading to the inlet side of the compressor.

Figure 10:
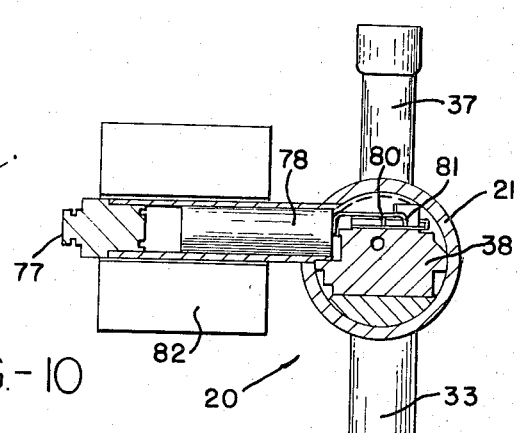
FIGURE 10 is a cross-sectional view taken on line 10—10 of FIGURE 1.

However, when it is desired to switch the operation of the refrigerant system so that the previously described condenser will now operate as an evaporator and the previously described evaporator will operate as a condenser, an electrical impulse is directed to the coil 82 to pull the armature 79 to the left in FIGURE 10 and downwardly in FIGURE 2 whereby the pilot valve member 57 is pivoted from the position illustrated in FIGURE 13 to the position illustrated in FIGURE 14. With the pilot valve member 57 now disposed in the position illustrated in FIGURE 14, it can be seen that the passage means 64 of the pilot valve member 57 interconnects the port 50 with the port 54 thereof so that the chamber 45 of the valve construction 20 is now interconnected to the first passage means 41 of the valve member 38 and, thus, to the exhaust or low pressure nipple 33.

Also, with the pilot valve member 57 disposed in the position illustrated in FIGURE 14, it can be seen that the aperture 67 of the valve member 57 is now aligned with the aperture 49 thereof whereby the pressure fluid in the intermediate chamber 46 of the housing 21 is interconnected to the chamber 44 of the valve construction 20.

With the pressure fluid now being directed to chamber 44 and the chamber 45 being interconnected to exhaust, the pressure on both sides of the left-hand piston end 42 are equal. However, the high pressure fluid in intermediate chamber 44 acts against the left side of the right-hand piston end 43 while low pressure exists in chamber 45 whereby the force of the pressure fluid acting against the left side of the right-hand piston end 43 and the force of the pressure fluid acting against the left side of the left-hand piston end 42 axially moves the valve member 38 from the position illustrated in FIGURE 9 to the position illustrated in FIGURE 12. In this manner the first passage means 41 of the valve member 38 fluidly interconnects the ports 30 and 31 while sealing the port 29 from the port 30. In addition, the pressure fluid in the intermediate chamber 46 is now interconnected by the left-hand passage means 48 in the valve member 38 to the port 29 whereby the pressure fluid from the nipple 37 is now directed to the nipple 32 and the nipple 34 is now interconnected to the exhaust nipple 33.

In this manner, the formerly described refrigerant evaporator now acts as a condenser whereby the heat thereof will heat up the structure associated therewith while the previously described condenser will now act as an evaporator so that the refrigerant system reversed by the valve construction 20 of this invention permits the refrigerant system to provide a cooling cycle when the valve construction 20 is disposed in the position illustrated in FIGURE 9 and to provide a heating cycle when disposed in the position illustrated in FIGURE 12. In order to permit the axial movement of the valve member 38 from the position illustrated in FIGURE 9 to the position illustrated in FIGURE 12, it can be seen that the arm 69 of the pilot valve member 57 is moved from the position illustrated in FIGURE 13 to the position illustrated in FIGURE 14 whereby the arm 69 in FIGURE 14 is parallel to the axial movement of the valve member 38 and permits the same to slide relative to the tangs 80 and 81 of the means 79 interconnecting the armature 78 to the pilot valve member 57.

When it is desired to reverse the refrigerant system back to the cooling cycle thereof, the electrical impulse to the coil 82 is terminated whereby the force of the spring 70 returns the pilot valve member 57 from the position illustrated in FIGURE 14 to the position illustrated in FIGURE 13 whereby the aperture 49 of the valve member 38 is now interconnected to the aperture 54 thereof and, thus, to the first passage means 41 of the valve member 38 so that the chamber 44 is interconnected to the exhaust or low pressure nipple 33. In addition, the aperture 50 of the valve member 38 is now interconnected to the intermediate chamber 46 by means of the opening 66 in the pilot valve member 57 whereby pressure fluid from the intermediate chamber 46 is now interconnected to the chamber 45 so that the pressure fluid in the chamber 45 will be equal to the pressure in the intermediate chamber 46. Thus the force of the pressure fluid in chamber 46 acting against the right side of the left-hand piston end 42 and the force of the pressure fluid in chamber 45 acting against the right side of the right-hand piston end 43 will axially move the valve member 38 from the position illustrated in FIGURE 12 back to the position illustrated in FIGURE 9. In this manner, the nipple 32 is now interconnected to the nipple 33 by means of the first passage means 41 of the main valve member 38 and the intermediate chamber 46 is interconnected to the nipple 34 by the right-hand passage means 48 in the valve member 38 to cause the previously described cooling cycle of the refrigerant system.

Therefore, it can be seen that the valve construction 20 of this invention operates in a unique and novel manner to provide a main valve reversing operation by utilizing a pilot valve means carried on the main valve means so that a relatively small force is required to move the pilot valve member between its operating position to effect the movement of the large main valve member 38.

If desired, the various parts of the valve construction 20 of this invention can be reversed in the manner illustrated in FIGURES 15–18 wherein like reference numerals are utilized to indicate like parts.

As illustrated in FIGURES 15–18, it can be seen that the pilot valve member 57 is operated by the armature 78 with the armature 78 being disposed at the top of the valve construction in FIGURE 15 rather than at the bottom thereof as illustrated in FIGURE 2.

However, it is readily apparent from the previous description of the valve construction 20 of FIGURE 1 that the valve construction of FIGURES 15–18 operates in the same manner whereby further description of the operation and parts thereof is not required.

Accordingly, this invention not only provides an improved valve construction having many novel features as set forth above, but also this invention provides improved parts for such a valve construction or the like.

While the form of the invention now preferred has been disclosed as required by the statutes, other forms may be used, all coming within the scope of the claims which follow.

What is claimed is:

1. In combination, a housing having a cavity therein and being interrupted by port means, a main valve member disposed in said cavity and being axially movable to interconnect various of said port means together, the ends of said main valve member cooperating with said housing to define a pair of opposed chambers and an intermediate chamber in said housing, and a pilot valve member pivotally carried by said main valve member and being adapted to selectively interconnect said intermediate chamber to one of said opposed chambers while interconnecting the other opposed chamber to one of said port means.

2. A combination as set forth in claim 1 and including means to normally maintain said pilot valve member in one position thereof.

3. A combination as set forth in claim 1 and including an actuator for moving said pilot valve member between its operating positions.

4. In combination, a housing having a cavity therein and being interrupted by port means, a main valve member disposed in said cavity and being axially movable to interconnect various of said port means together, the ends of said main valve member cooperating with said housing to define a pair of opposed chambers and an intermediate chamber in said housing, and a pilot valve member carried by said main valve member and being adapted to selectively interconnect said intermediate chamber to one of said opposed chambers while interconnecting the other opposed chamber to one of said port means, said pilot valve member having a passage therein provided with opposed ends, said pilot valve member being pivotally mounted to said main valve member at one of said ends of said passage thereof.

5. A combination as set forth in claim 4 wherein the opposed ends of said passage of said pilot valve member are disposed in sliding and sealing relation against said main valve member.

6. A combination as set forth in claim 4 wherein said main valve member has a tubular member received in said one end of said passage of said pilot valve member to pivotally mount said pilot valve member to said main valve member.

7. A combination as sett forth in claim 6 wherein said main valve member has a recess therein for interconnecting various of said port means together, said recess being fluidly interconnected to said tubular member.

8. In combination, a housing having a cavity and being interrupted by port means, a main valve member disposed in said cavity being axially movable to interconnect various of said port means together, the ends of said main valve member cooperating with said housing to define a pair of opposed chambers and an intermediate chamber in said housing, means for interconnecting said intermediate chamber to a source of pressure fluid, means for interconnecting one of said port means to exhaust, said main valve member having means for selectively interconnecting said one port means with one of two other of said port means while interconnecting said intermediate chamber to the other of said two port means, and a pilot valve member pivotally carried by said main valve member and being adapted to selectively interconnect said intermediate chamber to one of said opposed chambers while interconnecting the other opposed chamber to said one port means.

9. A combination as set forth in claim 8 wherein said main valve member has a recess therein for interconnecting said one port means to said other port means, said recess having a substantially D-shaped cross-sectional configuration.

10. In combination, a housing having a cavity therein, said housing having a valve seat therein, said valve seat having three ports therein, a main valve member disposed in said cavity and being axially movable therein, opposed piston ends on said main valve member and cooperating with said housing to define a pair of opposed chambers and an intermediate chamber in said housing, said main valve member cooperating with said valve seat and having a first passage means for interconnecting one of said ports selectively with either of the other two ports, said main valve member having second and third passage means for respectively interconnecting said intermediate chamber with the port not interconnected to said one port by said first passage means, said main valve member having a valve seat provided with two apertures leading respectively to said opposed chambers and a third aperture leading to said first passage means, and a pilot valve member pivotally carried by said main valve member and being adapted to selectively interconnect said third aperture to one of said two apertures while interconnecting said intermediate chamber with the other of said two apertures.

11. A combination as set forth in claim 10 wherein a spring means is carried by said housing and tends to hold said pilot valve member in one position thereof.

12. A combination as set forth in claim 10 wherein an actuator is carried by said housing for moving said pilot valve member between its operating positions.

13. A combination as set forth in claim 10 wherein a tubular member is disposed in said third aperture and said pilot valve member is pivotally mounted on said tubular member.

14. A combination as set forth in claim 10 wherein said housing has port means for interconnecting a fluid pressure source of said intermediate chamber.

15. In combination, a housing having a cavity therein, a valve seat disposed in said cavity and having three ports therein, a main valve member disposed in said cavity and being axially movable therein, opposed piston ends on said main valve member and cooperating with said housing to define a pair of opposed chambers and an intermediate chamber in said housing, said main valve member cooperating with said valve seat and having a first passage means for interconnecting one of said ports selectively with either of the other two ports, said main valve member having second and third passage means for respectively interconnecting said intermediate chamber with the port not interconnected to said one port by said first passage means, said valve member having a valve seat provided with two apertures leading respectively to said opposed chambers and a third aperture leading to said first passage means, means for interconnecting said intermediate chamber to a source of pressure fluid, means for interconnecting said one port to exhaust, and a movable pilot valve member carried by said main valve member and having a first passage for interconnecting said third aperture with either of said two apertures and having second and third passages for respectively interconnecting said intermediate chamber with the aperture of said two apertures not interconnected to said third aperture by said first passage of said pilot valve member.

16. A combination as set forth in claim 15 wherein said pilot valve member has an arm, and an actuator is operatively interconnected to said arm to move said pilot valve member between its operating positions while permitting axial movement of said pilot valve member relative to said actuator.

17. A combination as set forth in claim 15 wherein said housing is cylindrical.

18. A combination as set forth in claim 15 wherein a solenoid operated actuator is operatively interconnected to said pilot valve member to cause movement of said pilot valve member between its operating portions.

19. A combination as set forth in claim 18 wherein said actuator moves perpendicular to the movement of said main valve member.

References Cited

UNITED STATES PATENTS

| 85,583 | 1/1869 | Hardie | 137—625.63 |
| 152,237 | 6/1874 | Loretz | 137—625.63 |
| 237,602 | 2/1881 | Roberts | 137—625.63 |
| 284,744 | 9/1883 | Lamy | 137—625.63 |
| 295,669 | 3/1884 | Nisbet | 137—625.63 |
| 1,119,640 | 12/1914 | Roettger | 137—625.63 |
| 2,983,286 | 5/1961 | Greenwalt et al. | |
| 3,004,557 | 10/1961 | Wiegers | 251—31 X |

FOREIGN PATENTS 909,320 10/1961 Great Britain.

M. CARY NELSON, *Primary Examiner.*

R. J. MILLER, *Assistant Examiner.*